(12) United States Patent
Strong

(10) Patent No.: US 7,722,356 B2
(45) Date of Patent: May 25, 2010

(54) METHOD AND APPARATUS FOR THE MANIPULATION OF FRACTIONS USING TRANSPARENCIES

(76) Inventor: Dorothy Strong, 2820 Paris Rd., Olympia Fields, IL (US) 60461

( * ) Notice: Subject to any disclaimer, the term of this patent is extended or adjusted under 35 U.S.C. 154(b) by 1037 days.

(21) Appl. No.: 11/438,501

(22) Filed: May 23, 2006

(65) Prior Publication Data
US 2008/0005217 A1    Jan. 3, 2008

Related U.S. Application Data

(60) Provisional application No. 60/794,579, filed on Apr. 23, 2006.

(51) Int. Cl.
*G09B 19/02* (2006.01)
(52) U.S. Cl. .................. 434/196; 434/191; 434/209
(58) Field of Classification Search .................. 434/188, 434/191, 195, 196, 198, 205, 207, 208, 209 434/214, 215
See application file for complete search history.

(56) References Cited

U.S. PATENT DOCUMENTS

| 3,204,344 | A | * | 9/1965 | McMeen | 434/196 |
|---|---|---|---|---|---|
| 5,076,793 | A | * | 12/1991 | Aghevli et al. | 434/196 |
| 5,470,234 | A | * | 11/1995 | Sher | 434/196 |
| 5,529,497 | A | * | 6/1996 | Bigold | 434/191 |
| 5,823,783 | A | * | 10/1998 | Adams | 434/208 |
| 6,575,755 | B2 | * | 6/2003 | Dreyfous | 434/196 |
| 6,755,658 | B2 | * | 6/2004 | Frieman | 434/191 |
| 6,813,841 | B1 | * | 11/2004 | Ramsey | 33/494 |
| 7,052,279 | B1 | * | 5/2006 | Losq | 434/191 |

* cited by examiner

*Primary Examiner*—Kurt Fernstrom
(74) *Attorney, Agent, or Firm*—Raymond N. Ervin, Ltd.; Raymond Nathaniel Ervin

(57) ABSTRACT

The invention provides a method and apparatus for operations of addition, subtraction, multiplication, and division of fractions, decimals, percents, proportions and equations. It allows the students to find the transparent area models on their sheets with the correct parts shaded, (2) students can count the total number of parts and the total number of shaded parts in each model, (3) the relationship of the shaded parts to the total number in each model can be named, (4) by intersecting the vertical transparent area model for one whole with horizontal transparent area models for one whole to show examples of one whole being renamed several different ways.

5 Claims, 3 Drawing Sheets

METHOD AND APPARATUS FOR THE MANIPULATION OF FRACTIONS USING TRANSPARENCIES

This patent application is a continuation in part of provisional application 60/794,579 filed on Apr. 23, 2006.

FIELD OF THE INVENTION

The invention relates to a method and apparatus for the renaming, addition, subtraction, multiplication, and division of fractions and decimals. More specifically, the manipulation of fractions using transparent overlays as an instructional tool for the understanding of rational numbers and renaming numbers in several different ways. The overlays are manipulated by the learners themselves.

BACKGROUND OF THE INVENTION

For generations the process of teaching students how to multiply, divide and subtract decimals and fractions, have led to a variety of teaching aids implemented in this process. Pie charts, fragmented items, and pictures are often used to help the student to visualize the segment or segments associated with the numbers. However, heretofore these aids have lacked in instructional value when attempting multiplication, and division. The current process is designed to provide students with hands-on experiences through the manipulation of models that lead to understanding and applying the principals.

The properties of one "1" are involved in renaming numbers in several different ways. Transparent area models allow the students to feel, touch, and conceptualize representations for one being used to make other representations for one whole and fractions.

The process is advantageous with respect to current processes because: (1) It allows the students to find the transparent area models on their sheets with the correct parts shaded, (2) Students can count the total number of parts and the total number of shaded parts in each model, (3) the relationship of the shaded parts to the total number in each model can be named, (4) By intersecting the vertical transparent area model for one whole with horizontal transparent area models for one whole to show examples of fractions and decimals being renamed several different ways.

The method's approach teaches the appropriate names for one whole fractions, decimals, percents, proportions and equations. All of the work that is done with rational numbers is built on the following principals: 1) one has many names, 2) any number multiplied by one is that number, 3) any number divided by one is that number, and 4) there are many ways to represent numbers.

SUMMARY OF THE INVENTION

The invention provides a method and apparatus for operations of addition, subtraction, multiplication, and division of fractions, decimals, percents, and related representations of proportions and equations. It allows the students to find the transparent area models on their sheets with the correct parts shaded, (2) Students can count the total number of parts and the total number of shaded parts in each model, (3) the relationship of the shaded parts to the total number in each model can be named, (4) By intersecting the vertical transparent area model for one whole with horizontal transparent area models for one whole the learner shows examples of one whole ("1") being renamed several different ways.

It is an objective of the method to provide transparent area models on their sheets with all of the parts needed.

Another objective of the method is to provide a means for counting the total number of parts and total number of shaded parts in each model.

It is another objective of the method to allow for the naming the relationship of the shaded parts to the total number in each model.

It is an objective of the invention to overlay the vertical transparent area models for one whole with horizontal transparent area models for one whole and other fractions or decimals to show examples of one whole being used to rename numbers several different ways.

It is an objective of the invention to overlay vertical transparent area models for one whole and other fractions or decimal with horizontal transparent area models for one whole and other fractions or decimals to show examples of multiplying fractions and decimals.

BRIEF DESCRIPTION OF THE DRAWINGS

The accompanying drawings, which are incorporated in and form part of the specification, illustrate an embodiment of the present invention and together with the description, serve to explain the principles of the invention. In the drawings.

DETAILED DESCRIPTION OF THE INVENTION

The invention provides a process for providing students with hands-on experiences that lead to understanding and applying the principals. The properties of one are involved in renaming numbers in several different ways. Transparent area models are used to allow the students to feel, touch, and conceptualize representations for one being used to make other representations for one whole and other fractions and decimals.

This method is advantageous with respect to current processes because: (1) It allows the students to find the transparent area models on their sheets with the correct parts shaded, (2) Students can count the total number of parts and the total number of shaded parts in each model, (3) the relationship of the shaded parts to the total number in each model can be named, (4) By intersecting the vertical transparent area model for one whole with horizontal transparent area models for one whole and other fractions show examples of one whole and other fractions and decimals being renamed several different ways.

Example 1

Addition

Figure 1:
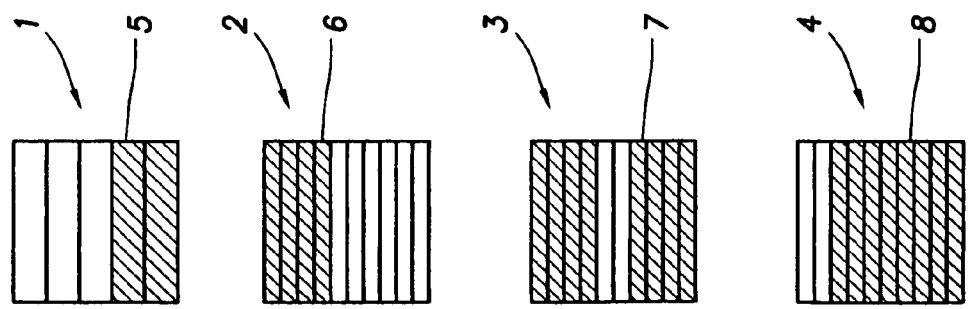
FIG. 1 shows a detail of the method for performing addition.

More particularly in the addition of fractions, transparency models are used as overlays to count the units in each representation of one. For example, referring to FIG. 1 in the addition of two-fifths and four-tenths. The first transparency model 1 shows a representation of two fifths. The shaded portion of the transparency model 2 represents two-fifths 5. A second transparency model 3 having a shaded portion representing four-tenths 6 is provided. As noted in chart 1, orient each transparency model (1 and 2) the same way and place the transparency models (1 and 2) over a third blank transparency model 4. By rotating the transparency model 2 and counting the number of total units 7, the user can determine the total number. After sliding the transparency model 3 down representing four-tenths, the user can count the total number of units 8.

CHART 1 a. Find two fifths and four tenths turned the same way on the transparency models.
b. Name the total number of parts into which each one is divided and the total number of shaded parts in each figure
c. Name each of the figures as the number of shaded parts out of the total number of parts in the figure.
d. Rotate the transparency model for four tenths and place the model for four tenths on top of the model for two fifths.
e. Count the total number of shaded parts into which the new figure is now divided.
f. Count to find out the number of parts that are shaded and the number of parts that are not shaded.
g. Slide the transparency model for four tenths down to show combining two fifths and four tenths.
h. The answer is the total number of parts that are shaded.

They should see that: $2/5 + 4/10 = 4/5$

In the subtraction of fractions, a similar method is employed. The transparency models must be oriented in the same way. The user must count the units in each representation of one. By counting the number of shaded units and naming the shaded units as part of the total. The transparency models are placed upon each other and a count of the total number of units showing in the transparency model determines the appropriate value.

Example 2

Subtraction

As show in chart 2, in the subtraction of the fractions this method as recited above allows for an easy solution to the problems.

CHART 2 a. Count and name the units in the transparency model representing what is to be subtracted.
b. Count the number of shaded units and name the shaded units as part of the total number of units.
c. Count and name the units in the transparency model representing the original fraction.
d. Place the transparency model for the number subtracted on the top of the transparency model for the original number.
e. Count and name the total number of parts of the whole left. Name them as part of the whole in the smallest unit. This is the number of the parts left when you subtract.
f. Name the new transparency model as parts out of the whole.

Figure 2:
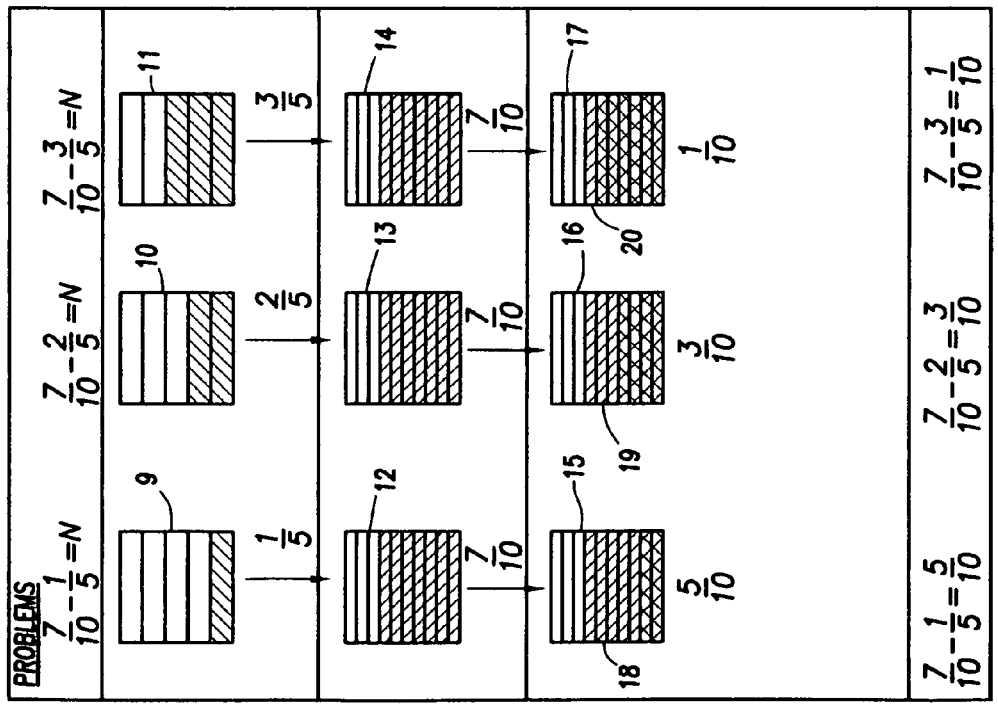
FIG. 2 show a detail of the method for performing subtraction.

More particularly, referring to FIG. 2 in the subtraction of fractions one-fifth, two-fifths, and three-fifths from the fraction seven-tenths, the steps are as follows: a.) Count and name the units in the transparency models (9-11 and 12-14); b.) Count the number of shaded units and name the shaded units as part of the total number of units; c.) Count and name the units in the transparency model representing the original fraction; d.) Place the transparency model for the number subtracted on top of the transparency model for the original number; e.) Count and name the total number of parts of the whole left (15-17). Name them as part of the whole in the smallest unit. This is the number of parts left when you subtract (18-20); and f.) Name the new transparency model as parts out of the whole.

The multiplication of a fraction is simplified by placing a vertical transparency model on top of a horizontal transparency model, and counting the number of units in their intersection. This method begins by selecting two transparency models, one vertical fraction representation and one horizontal transparency model for another fractional representation. Counting the number of parts in each of the representations of one whole, and placing one transparency model for one upon the other. Counting the number of parts that result from their intersection. Finally, naming the new transparency model as a part to the whole relationship.

Example Three

Multiplication

Figure 3:
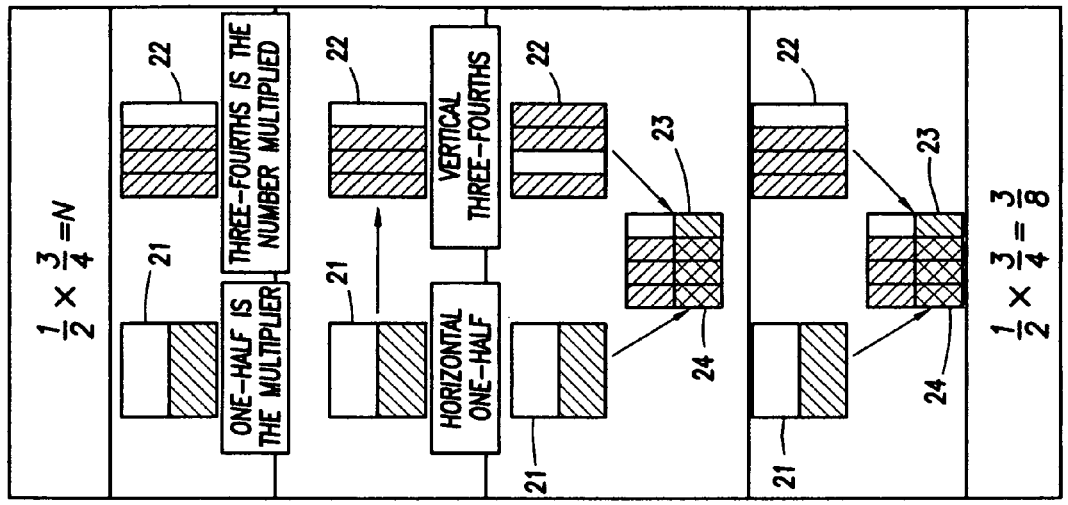
FIG. 3 show a detail of the method for performing multiplication.

As show in FIG. 3, multiplication of fractions is represented by the equation one-half times three quarters. The multiplier is one-half, select a horizontal transparency 21 representation for the fraction. The number being multiplied is one-fourth, select a vertical transparency model 22 representation for the fraction. Place the one-half transparency model on top of the vertical one-fourth transparency model 22. Count the total number of new units 23. Then count the total number of intersecting units 24. Finally, name the intersection as a part of the total new transparency model equaling three-eighths.

Figure 4:
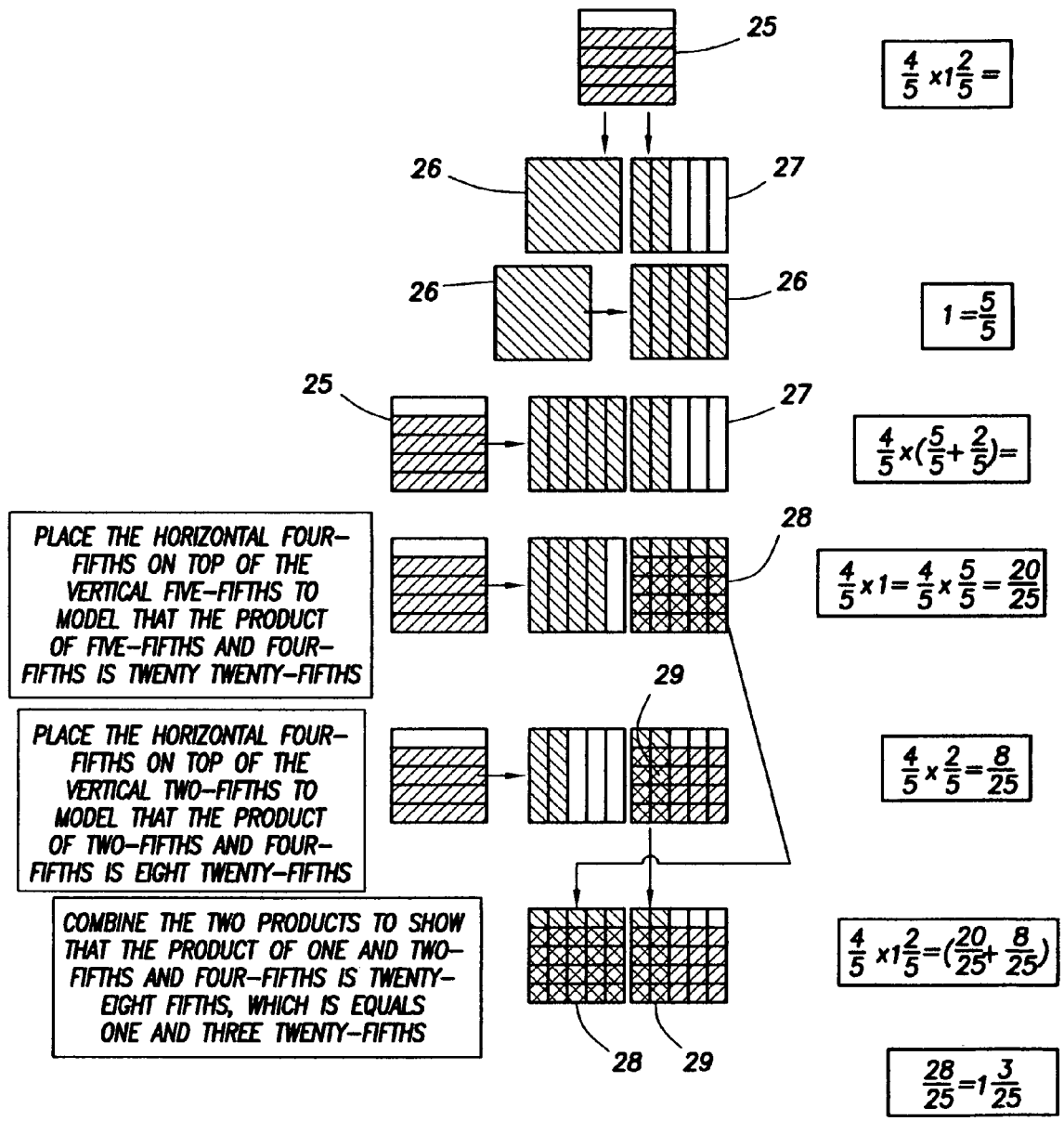
FIG. 4 show a detail of the method for performing multiplication of mixed fractions.

Multiplying mixed fractions is also simplified by using the transparency models. By using the distributive property, manipulating transparencies allows the user to see, touch, feel, and conceptualize. As shown in FIG. 4, the method is employed to solve the equation four-fifths times one and two-fifths. In this example, a horizontal four-fifths transparency model 25 is selected along with a five-fifths and two-fifths transparency model (26 and 27). Place the four-fifths model 25 on top of the five-fifths transparency model 27 and count the total number of units. Count the shaded number of intersecting units 28. Now place the four-fifths transparency model on top of the two-fifths model 27 and count the total number of units. Also count the total number of intersecting shaded units and add the first intersecting shaded units with the second intersecting shaded units to get the numerator of the answer. Add the first number of units with the second total number of units 29 to get the denominator of the answer, equaling one and three-twenty-fifths.

The division of fractions involves a dividend, a divisor, and quotient. The method of division is exercised with transparency area models by finding the number of times the divisor can be used as a measure on the dividend. Both divisor and dividend should be oriented the same way. In dividing fractions two questions are answered. How many times can the measuring unit be used as a measure on the item measured? How many of the measuring unit is there in the item being measured?

Example 4

Division

Figure 5:
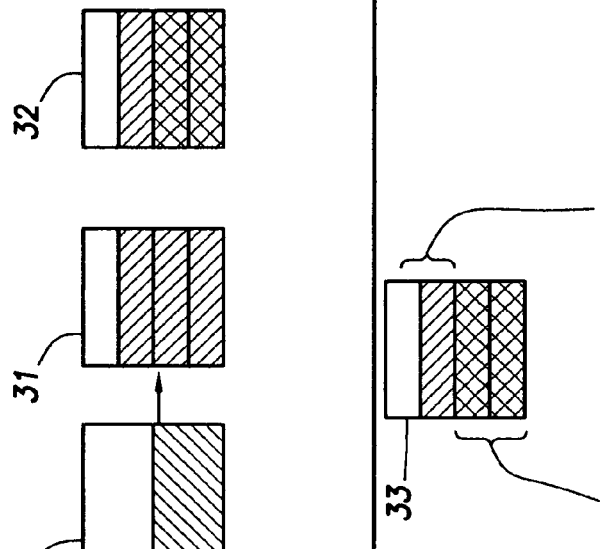
FIG. 5 show a detail of the method for performing division.

FIG. 5 shows the resultant answer of the problem three fourth divided by one half. The question is how many times can one-half of one be used as a measure on three-fourths? Additionally, how many one-halves are there in three-fourths?

In the operation of division, the method is defined by the steps of placing the one-half transparency model 30 on top of the three-fourths transparency model 31. Count the total number of times one-half can be used as a measure 32. Count the total number of fractional times one-half can be used on the remainder 33. In this example one-half is used one time and one-half is the remainder, for an answer of one and one-half.

The invention has been described in detail with particular reference to certain preferred embodiments thereof, but it will be understood that variations and modifications can be effected within the spirit and scope of the invention.

The embodiments of the invention in which an exclusive property or privilege is claimed are defined as follows:

1. A method of performing addition of fractions using transparencies comprising the steps of:
    introducing a first transparency having a shaded area and a total number of units corresponding to a fractional representation;
    placing a second transparency having a second shaded area and a total number of units corresponding to a fractional representation, over the first transparency;
    orienting said first and second transparencies in a proper position;
    counting the number of total units showing;
    rotating the second transparency on the first transparency;
    sliding the second transparency down over the first transparency and aligning the shaded areas; and
    counting the total number of shaded areas.

2. A method of performing the multiplication of fractions using transparencies comprising the steps of:
    introducing a first horizontal transparency having a shaded area and a total number of units corresponding to the fractional representation of a number representing the number to be multiplied;
    introducing a second vertical transparency having a second shaded area and a total number of units corresponding to a fractional representation of a number to be as a multiplier;
    placing the second vertical transparency over the first horizontal transparency;
    counting the total number of units; and
    determining the total number of intersecting shaded units.

3. The method as recited in claim 2 whereby the step of placing the second vertical transparency over the first horizontal transparency further comprises said first horizontal transparency representing a mixed fraction.

4. The method as recited in claim 3 whereby the first horizontal fraction is represented by two transparencies, and said second vertical transparency is placed over the first and second horizontal transparencies and the total number of units are counted.

5. A method of performing operation of division of fractions using transparencies comprising the steps of:
    introducing a first transparency having a shaded area and a total number of units corresponding to a fractional representation of the dividend;
    placing a second transparency having a second shaded area and a total number of units corresponding to a fractional representation of the divisor, over the first transparency;
    determining the total number of times the second transparency can be used as a full measure of the first transparency; and
    determining the fractional number of times the second transparency can be used on the remaining portion of said first transparency.

* * * * *